(12) United States Patent
Sun (10) Patent No.: US 7,027,546 B2
(45) Date of Patent: Apr. 11, 2006

(54) METHOD AND SYSTEM FOR PROVIDING A SEMI-DATA AIDED FREQUENCY ESTIMATOR FOR OQPSK

(75) Inventor: Feng-Wen Sun, Germantown, MD (US)

(73) Assignee: Hughes Network Systems Inc., El Segundo, CA (US)

( * ) Notice: Subject to any disclaimer, the term of this patent is extended or adjusted under 35 U.S.C. 154(b) by 843 days.

(21) Appl. No.: 10/074,500

(22) Filed: Feb. 11, 2002

(65) Prior Publication Data

US 2003/0152179 A1    Aug. 14, 2003

(51) Int. Cl.
*H04L 7/00* (2006.01)
(52) U.S. Cl. ...................................... 375/355
(58) Field of Classification Search ............... 375/316, 375/340, 354, 355, 362, 363, 364, 365, 366; 370/503, 509, 510, 511, 512, 513, 514, 342
See application file for complete search history.

(56) References Cited

U.S. PATENT DOCUMENTS 6,466,566 B1 * 10/2002  De Gaudenzi et al. ...... 370/342
6,560,303 B1 *  5/2003  Fan et al. ................... 375/365

* cited by examiner

*Primary Examiner*—Robert Pascal
*Assistant Examiner*—Krista Flanagan
(74) *Attorney, Agent, or Firm*—Craig Plastrik (57) ABSTRACT

An approach for performing synchronization is provided. Phase and timing offsets are first estimated in order to calculate a frequency offset. A receiver processes a signal received from a satellite and determine offset information. The receiver includes a phase estimator for estimating a phase offset of the received signal, a timing estimator for estimating a timing offset of the received signal, and a frequency estimator for deriving a frequency offset from the phase and timing offset. A determination is made as to whether the sampling was done at a peak wave point of the data.

25 Claims, 7 Drawing Sheets

METHOD AND SYSTEM FOR PROVIDING A SEMI-DATA AIDED FREQUENCY ESTIMATOR FOR OQPSK

FIELD OF THE INVENTION

The present invention relates to a method and system for training a receiver, and more specifically, to a method and system for performing synchronization as part of the processing of a received signal in a radio communication system.

BACKGROUND OF THE INVENTION

Radio communication systems involve the transmission of information over an air interface, for example, by modulating a carrier frequency with the transmitted information. Upon reception, a receiver attempts to accurately extract the information from the received signal by performing an appropriate demodulation technique. However, in order to demodulate a received signal, it is first necessary to synchronize timing between the transmitter and receiver. For example, clocking differences between the transmitter and the receiver provide for differences in bit timing.

Moreover, in some radio communication systems, information is transmitted in bursts, sometimes referred to as "frames". In these types of systems, it is also desirable to locate the beginning of a frame, so that information relevant to a particular receiver is isolated and demodulated.

Unfortunately, there exists many challenges associated with synchronizing to a received signal. For example, although the receiver may be tuned to an assigned frequency on which its intended signal has been transmitted, Doppler shifting may result in a large frequency offset between the frequency to which the receiver is tuned and the actual frequency of the desired information signal when it reaches the receiver after having traveled through the air interface. Moreover, the crystal oscillator used in the receiver is only accurate to within a certain number of parts per million, which may introduce an additional frequency offset.

In addition to an unknown frequency offset, a receiver must also cope with unknown phase accuracy, i.e., the receiver does not know the difference between the phase of the signal generated by its synthesizer at power-on and the phase of the received signal. Thus, the receiver faces at least three challenges in synchronizing to the received signal: unknown timing, unknown frequency offset and unknown phase. For timing and phase offsets relatively short training sequences can provide satisfactory estimation results. However, short training sequences do not provide satisfactory frequency estimation using current methods.

One method of over coming these challenges, the data aided technique, uses a long training sequence to estimate the frequency parameters. This requires significant overhead and time to train the receiver. For example, burst modems require around 100 symbols to get an accuracy of $10^{-4}$ relative to symbol rate at a signal to noise ratio of Es/No=5 dB. Since burst lengths can be as short as 200 symbols, large overheads can be prohibitive and result in reduced throughput.

Figure 1:
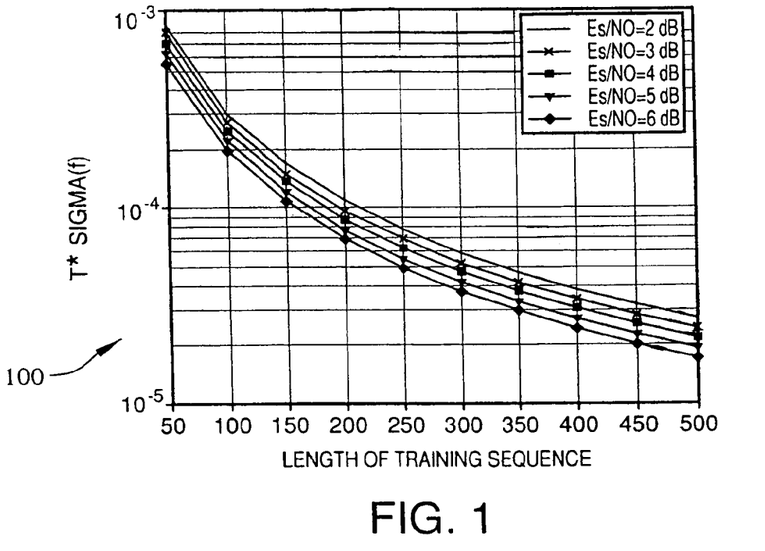
FIG. 1 depicts a graphical representation of a conventional data aided Cramer-Rao Bound illustrating an incident of frequency offset.

FIG. 1 is a graph 100 depicting the data-aided Cramer-Rao Bounds for frequency estimation. Specifically, graph 100 shows the theoretical bounds for a modem training sequence where a separate training sequence is communicated with the data. The training sequence is used to synchronize the signal and the data is then capable of being processed by the receiver. The horizontal axis depicts how many symbols are required to be communicated in order to train the receiver while the vertical axis depicts the accuracy of the estimation. As discussed above, the data aided approach reduces, throughput because of the training sequence that must be sent. For example, Internet data can be as short as 200 symbols while the training sequence required would be 100 symbols, which is not efficient because half of the bandwidth is dedicated to the training sequence.

Specifically, FIG. 1 plots the following modified Cramer-Rao bound for frequency estimation which can be represented by the following equation:

$$\sigma^2(f) \geq \frac{3}{2T^2\pi^2 N^3} \cdot \frac{1}{E_s/N_0}, \quad (1)$$

where T is the symbol duration and N is the length of training sequence. The modified Cramer-Rao bound is a lower bound for an unbiased estimator. The bound can be re-arranged as $$2\pi\sigma(f) \geq \sqrt{\frac{6}{N^3 E_s/N_0}}. \quad (2)$$

As can be seen from the FIG. 1, in order to achieve $10^{-4}$ accuracy, the training sequence has to be at least 175 symbols at 5 dB $E_s/N_o$.

Figure 2:
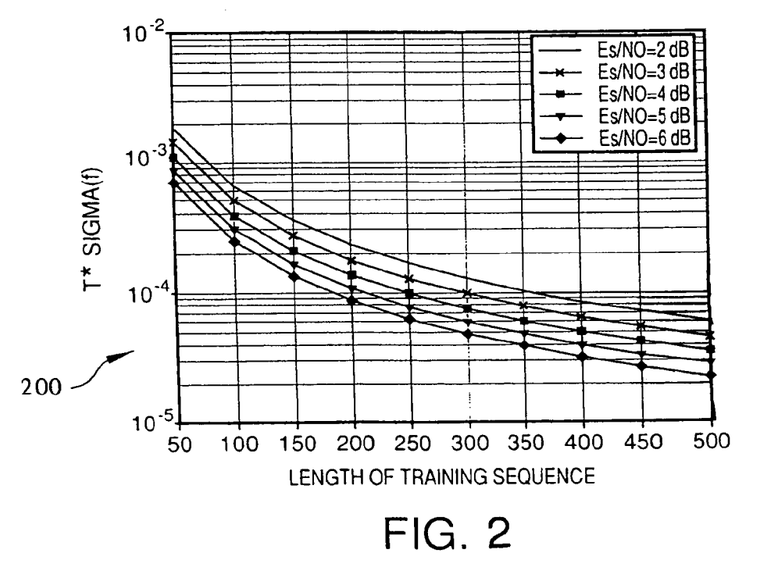
FIG. 2 depicts a graphical representation of a conventional non-data aided Cramer-Rao Bound illustrating an incident of frequency offset.

FIG. 2 is a graph 200 depicting a non-data aided Cramer-Rao bound for frequency offset. Compared to graph 100, graph 200 shows that training takes much longer to achieve the same accuracies compared to graph 100. The non-data aided approach takes much longer to train a modem. However, the benefit is that the training sequence is not required to be sent since synchronization is done before the data is received. Unfortunately, the time frame for synchronization using the non-data aided approach is prohibitive.

Without knowing the data, as expected, for estimation in the non-data aided case, performance is always poorer than in the data-aided case. Furthermore, non-data aided frequency estimation can be classified into timing aided or non-timing aided. Non-timing aided estimation typically has very poor performance. On the other hand, performance of timing aided estimation deteriorates very quickly if timing estimation becomes less accurate.

Current methodologies such as the data aided and non-data aided approach do not adequately eliminate and/or reduce these challenges to achieve sufficiently accurate synchronization at a high enough first frame success rate in the face of low signal-to-noise ratios. Therefore, it would be advantageous to provide new techniques for synchronizing to a received information signal that overcomes these drawbacks.

SUMMARY OF THE INVENTION

The present invention relates to synchronization of digital radio signals using a semi-data aided algorithm for frequency estimation. The frequency estimator utilizes the phase and timing information to proceed to derive the frequency estimation based on the unknown information-carrying data. A mitigation strategy is applied to effectively combat timing imperfections in the frequency estimation.

Specifically, a system and method for synchronizing a communication signal is provided, comprising a satellite adapted to transmit a signal. The signal includes data information and synchronization information. A receiver adapted to process the signal received from the satellite and determine offset information from said received signal is also provided. The receiver includes at least a phase estimator adapted to estimate a phase offset of the received signal, a timing estimator adapted to estimate a timing offset of the received signal, and/or a frequency estimator adapted to derive a frequency offset from the phase and timing offset information from said received signal. The receiver further includes at least a phase estimator adapted to estimate a phase offset of the received signal, a timing estimator adapted to estimate a timing offset of the received signal, and/or a frequency estimator adapted to derive a frequency offset from the phase and timing offset comprising removing the modulation from the received signal. The received signal is sampled for information carrying data. A determination is made as to whether the step of sampling was done at a peak wave point of the data, and the step of sampling is repeated in a response to a determination that the sampling was not done at a peak wave point of the data.

BRIEF DESCRIPTION OF THE DRAWINGS

The details of the present invention can be readily understood by considering the following detailed description in conjunction with an accompanying drawing, in which.

To facilitate understanding, identical reference numerals have used, where possible, to designate identical elements that are common to the figures.

DETAILED DESCRIPTION OF THE INVENTION

Figure 3:
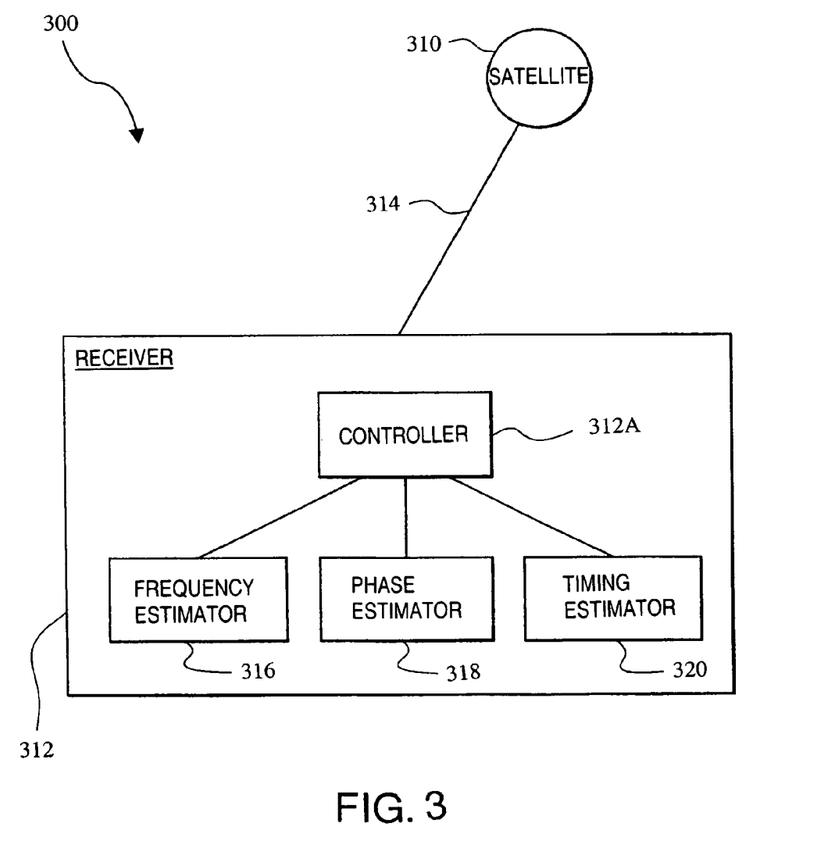
FIG. 3 depicts a high level communication system according to an embodiment of the present invention.

FIG. 3 depicts a high-level communication system according to an embodiment of the present invention. Specifically, communication system 300 comprises a satellite 310 for transmitting receiving or relaying a communication signal 314 including a unique word for synchronizing a receiver 312. The receiver 312 includes a controller 312A for operating the receiver 312, a frequency estimator 316, a phase estimator 318 and a timing estimator 320.

It will be appreciated by those skilled in the art that the communication signal 314 can be a Time Division Multiple Access (TDMA) signal, Code Division Multiple Access (CDMA) signal, cellular signal or the like.

In communication system 300, satellite 310 transmits communication signal 314 to receiver 312. Offset Quaternary Phase Shift Keying (OQPSK) modulation can be used due to its near constant envelope property. OQPSK is often used for a power limited system that needs to drive an amplifier close to saturation. However, other modulation techniques can be substituted and still fall within the scope of the present invention.

Communication signal 314 can be represented by the following equation:

$$s(t) = e^{j(2\pi ft+\theta)}\left\{\sum_i a_i h(t - iT - \tau) + j\sum_i b_i h(t - iT - T/2 - \tau)\right\} \quad (3)$$

where $a_i$, $b_i \in \{1, -1\}$ represent data, $h(.)$ is the shaping filter which is typically used when a signal is transmitted and the sender wants it to satisfy certain spectral requirements; and f, θ, τ are respectively a frequency offset, a phase offset and a timing offset. For coherent demodulation, the receiver 312 can estimate the unknown parameters f, θ, τ.

It will be noted that for each transmission burst, there is a short training sequence which comprises a unique word attached to the transmitted data of length M. The short training sequence comprises for instance, between about ten to twenty symbols. However, those skilled in the art will appreciate that the present range of ten to twenty symbols can vary and still fall within the scope of the invention. The unique word is a known sequence of symbols used by the receiver 312 for synchronization purposes. The receiver 312 utilizes this Unique Word to first obtain estimation for θ,τas vectors $\hat{\theta}$ and $\hat{\tau}$.

For the non-data aided training algorithm, the first step is to remove the modulation from the received signal x(t) where x(t)=s(t)+ noise. By squaring the incoming signal to obtain $x^2(t)$, though the modulation cannot be removed, the squared signal can be written as $$x^2(t)=\alpha(e(t))e^{j4\pi ft}+g(t), \quad (4)$$

where e(t) is the error of time estimation. In other words, e(t) is the time difference between t and the closet in-phase eye opening (also known as the point where the signal or amplitude is at its strongest), α(.) is a periodic function of period T, the symbol duration of the incoming OQPSK signal, and g(t) does not have any dominated signal at any single frequency, in other words, g(t) is close to white noise (typically not Gaussian). α(t) is also the amplitude of the signal. Specifically, the accuracy of α(t) depends on knowing the time.

Figure 4:
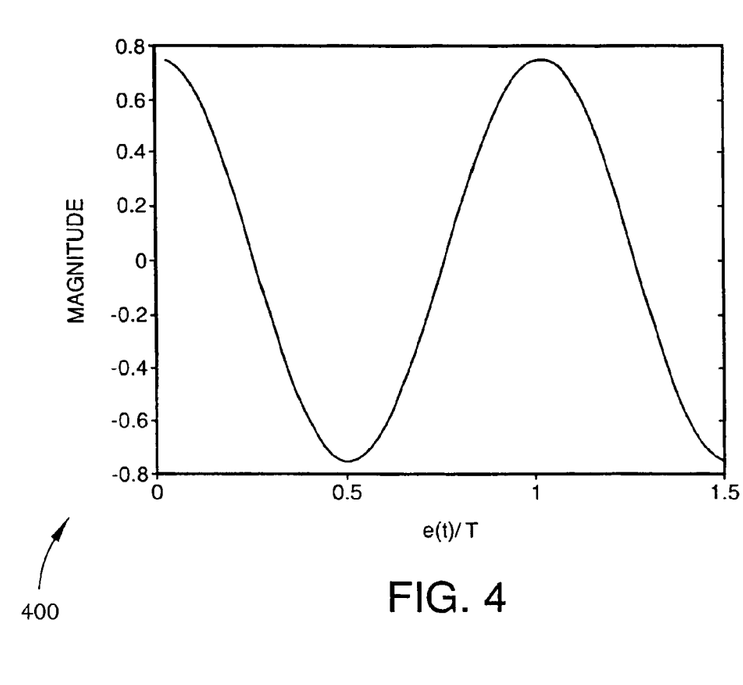
FIG. 4 depicts a graphical representation of frequency versus timing error according to an embodiment of the invention.

In FIG. 4, the graph 400 illustrates α(t) with t being the time offset from the eye-opening of the in-phase signal. It is periodic with period T and α(t) degenerates to zero when it is off by ¼ of the symbol duration at ½ a symbol, it is of the same magnitude at t=0 with an opposite sign. The following frequency estimators are formulated based on these analysis.

Assume the peak of the signal is u(n) which is represented by the equation $$u(n)=x_1(n*T/2+\hat{\tau})+jx_Q(n*T/2+\hat{\tau}) \quad (5)$$

with $\hat{\tau}$ being the time offset estimated from unique word. Note that before symbol timing offset T is determined, the sampling typically will not appear exactly at $n*T/2+\hat{\tau}$. In this case, interpolation can be used to obtain u(n) from the original samples. It can be assumed that u(0) corresponds to the estimated eye opening of the in-phase of the first symbol of the unique word, N is the length of the unique word and M is the length of the estimation window. The following equation computes the average $$(x_1, f_1) = \max_{\hat{f}}\left\{\text{Re}\left\{\sum_{k=0}^{M-1}(u(2k)^2 - u(2k+1)^2)e^{-j(4\pi\hat{f}k+2\hat{\theta}-2\pi N\hat{f})}\right\}\right\}; \quad (6)$$

where $\chi_1$ is the maximum values and $f_1$ are the frequencies to achieve the maximum value.

Figure 5:
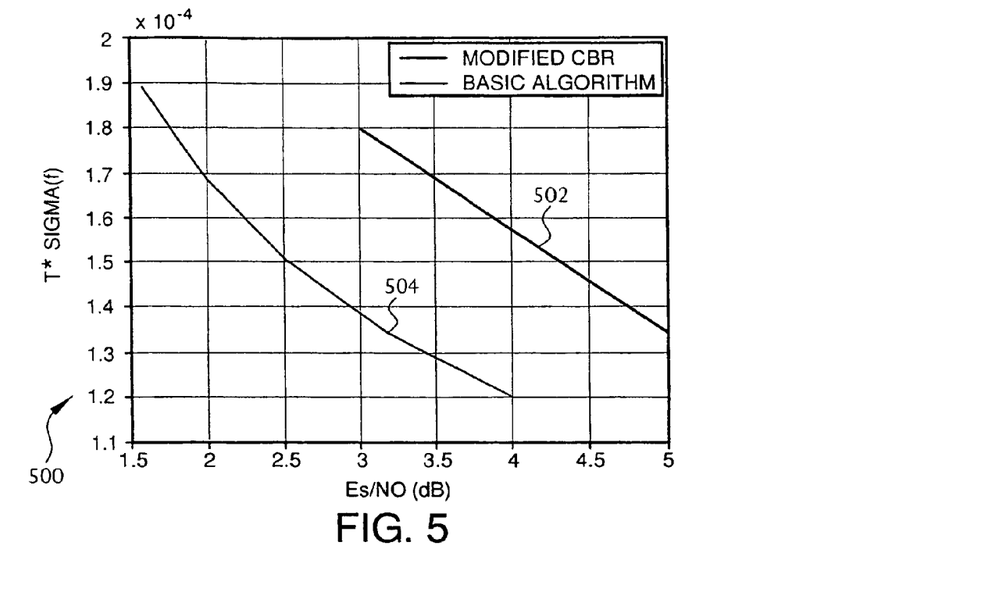
FIG. 5 depicts a graphical comparison of the root mean square errors of a modified CRB versus a basic algorithm according to an embodiment of the present invention.

Assume that a unique word of length 24 and second order Lagrange curve fitting timing estimator. Also included are the nonlinear effect of the power amplifier. FIG. 5 depicts the root-mean-square of an estimator with 230 symbols. From the graph 500, it is clear that the estimation given by equation 2 as shown by plot 502 is about 1.5 dB away from the theoretical Cramer-Rao bound of plot 504. Note that the Cramer-Rao bound decays with the length of information-bearing sequence at the power of three and linearly decays in respect to the signal to noise ration (dB). This means that the 1.5 dB difference does not give a very big root mean square error degradation. In graph 500 the vertical axis depicts the signal to noise ratio, and the horizontal axis depicts the residual error.

Figure 6:
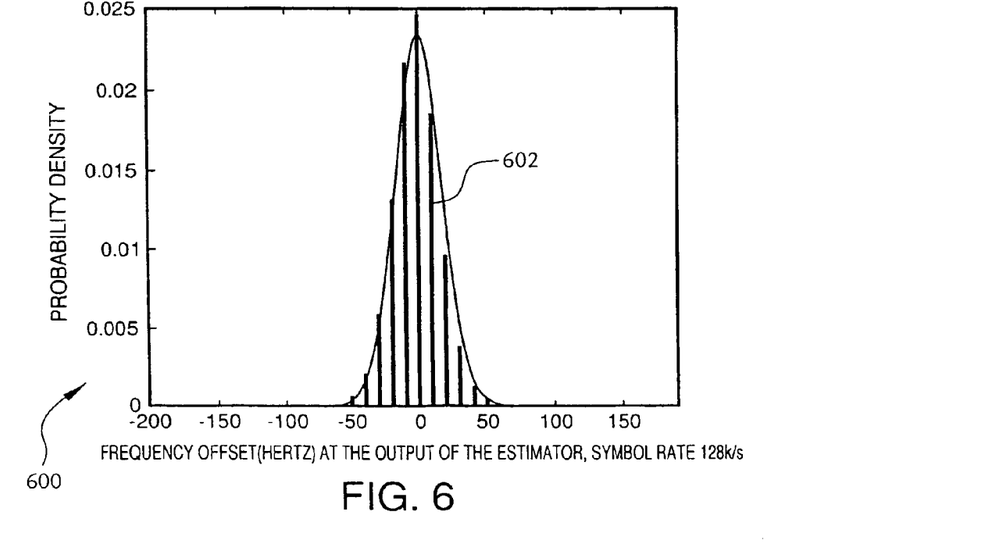
FIG. 6 depicts a frequency histogram illustrating frequency offset according to an embodiment of the present invention.

Referring to FIG. 6, which is a histogram of FIG. 5, graph 600. Besides the root mean square error, it is also interesting to look at the histogram of the residual at the output of the frequency estimator. The desired density of the residual frequency error is a Gaussian distribution which indicates that there is no dominated factor for the residual error frequency. Specifically, FIG. 6 depicts the histograms of the residual frequency at 5 dB Es/N0 with an estimation window equal to 230 symbols. The Gaussian distribution with the same standard deviation is also plotted. In the simulation, 128,000 symbols per second is assumed. From the plot 602, it is clear that for a small frequency (within 50 Hertz), the residual frequency error is approximated by the Gaussian distribution. However, for coded system, what is more relevant is large frequency errors that cause more damage while smaller frequency offsets can be tracked by a carrier recovery loop. However in plot 602, the density function at high frequencies is too small to be observed.

Figure 7:
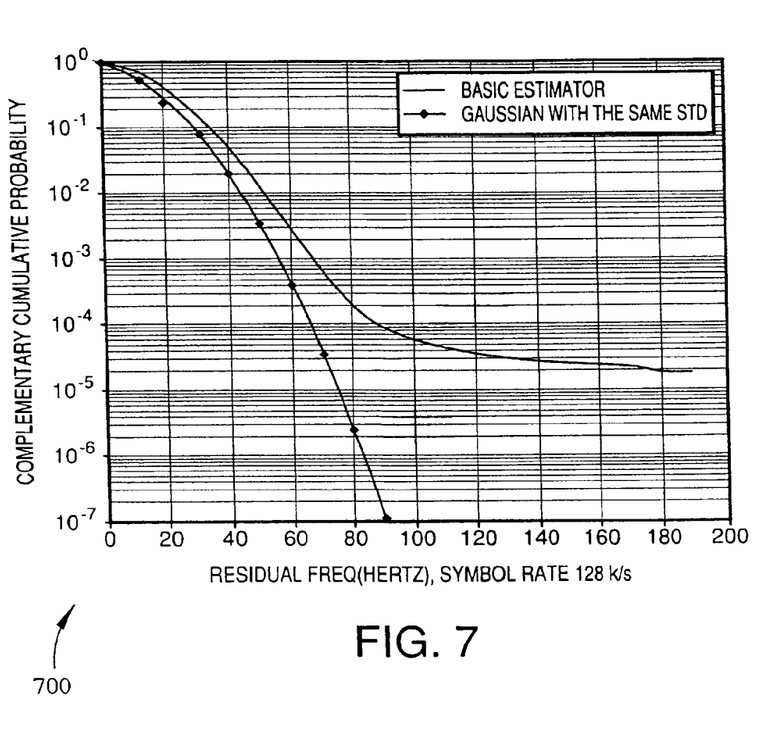
FIG. 7 depicts a graphical representation of the probability distribution of various estimators having a signal to noise ratio of Es/No=5 dB resulting from operation of a system and method according to an embodiment of the present invention.

Referring now to FIG. 7 which depicts the cumulative probability for the same simulation of FIGS. 4–6, it is clear that the basic algorithm deviates from the Gaussian distribution quite significantly for large frequency errors. Rather than looking at the probability of error at 10 Hz, FIG. 7 shows cumulative error. For example, graph 700 shows the probability of error greater than 10 Hz which is more beneficial.

Re-examining FIG. 4, it can be observed that for any given timing error residual e(t), if α(e(t)) is small, α(e(t)+T/4) will always have reasonable high magnitude. This motivates the following modification of the basic equation 6 which depends less on the initial timing estimation. If the initial timing estimation was wrong another estimation is required.

In addition to the equation 6, further computations lead to the following equation $$(x_2, f_2) = \max_{\hat{f}}\left\{\left|\text{Re}\left\{\sum_{k=0}^{M-1}(v(2k)^2 - v(2k+1)^2)e^{-j(4\pi\hat{f}k+2\hat{\theta}-2\pi N\hat{f})}\right\}\right|\right\}, \quad (7)$$

where $v(n)=x_1(n*T/2+\hat{\tau}+T/4)+jxQ(n*T/2+\hat{\tau}+T/4)$. The final estimated frequency is taken as $f_1$ if $x_1 \geq x_2$, otherwise, it is taken as $f_2$. Note that equation (7) is different from equation (6) not only with respect to having different inputs u(.) versus v(.), but also equation (7) takes the maximum over the absolute value. This is due to the fact that it cannot be known whether the timing estimator advances or lags the true timing offset. For example, the first estimate may have been a ¼ symbol off, but it is not known whether there was a lag or lead. Taking the absolute value accounts for the lag or lead.

In the case that u(0) corresponds to the end of the unique word, equation (6) and (7) should be replaced respectively with $$(x_1, f_1) = \quad (8)$$
$$\max_{\hat{f}}\left\{\text{Re}\left\{\sum_{k=0}^{M-1}(u(2k)^2 - u(2k+1)^2)e^{-j(4\pi fk+2\hat{\theta}-2\pi Nf)}\right\}\right\};$$

$$(x_2, f_2) = \max_{\hat{f}}\left\{\left|\text{Re}\left\{\sum_{k=0}^{M-1}(v(2k)^2 v(2k+1)^2)e^{-j(4\pi fk+2\hat{\theta}-2\pi Nf)}\right\}\right|\right\}, \quad (9)$$

Figure 8:
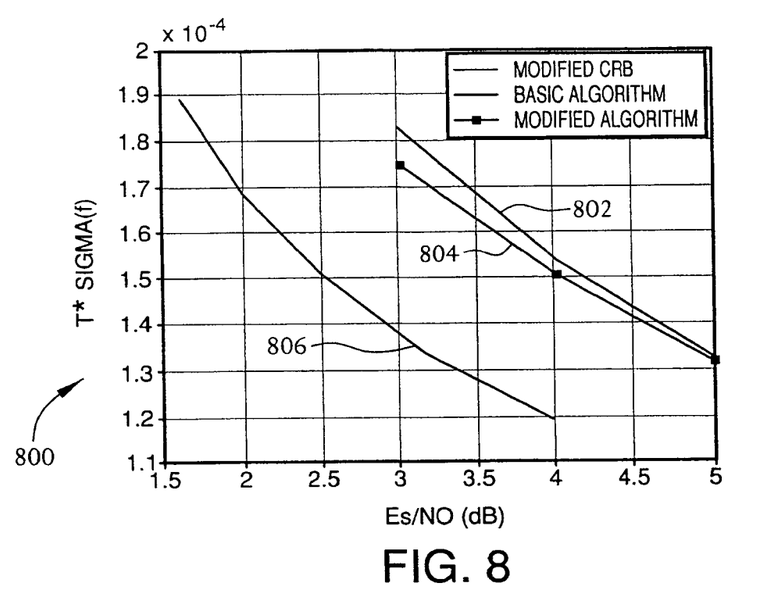
FIG. 8 depict a graphical representation of a comparison of the RMS of various estimators resulting from operation of a system and method according to an embodiment of the present invention.
Figure 9:
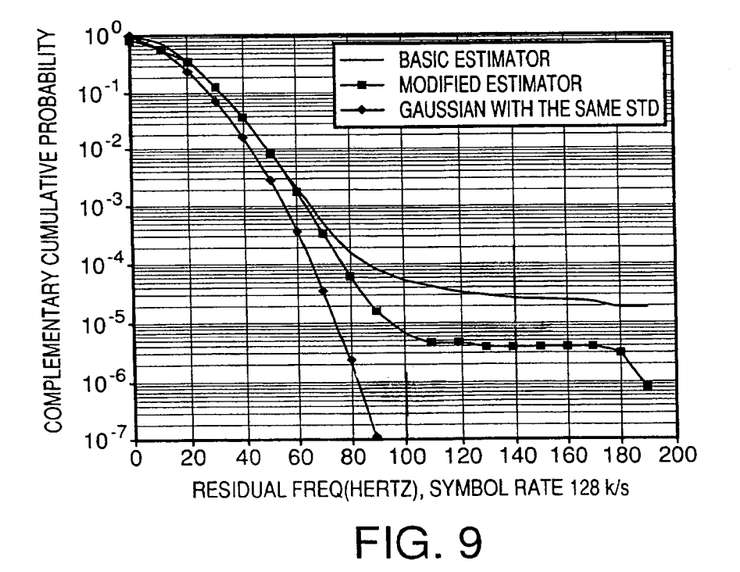
FIG. 9 depicts a graphical representation of a comparison of the RMS of various estimators having a signal to noise ratio of Es/No=5 dB resulting from operation of a system and method according to an embodiment of the present invention.
Figure 10:
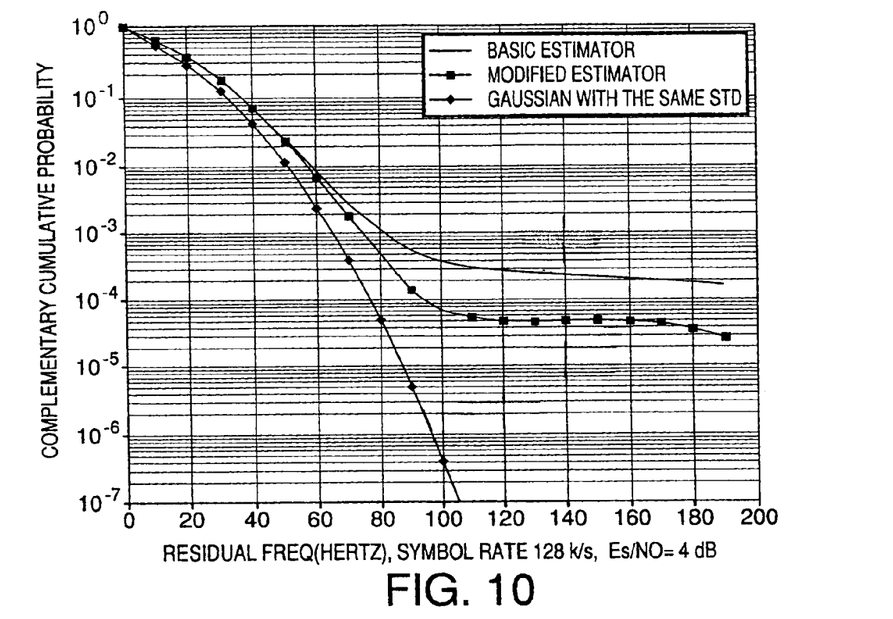
FIG. 10 depicts a graphical representation of the probability distribution of various estimators having a signal to noise ratio of Es/No=4 dB resulting from operation of a system and method according to an embodiment of the present invention.
Figure 11:
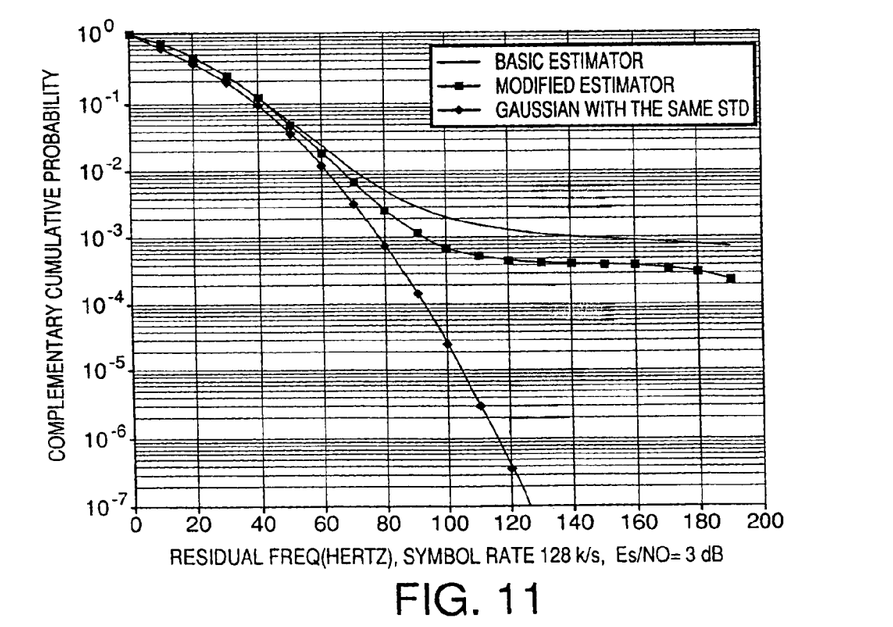
FIG. 11 depicts a graphical representation of the probability distribution of various estimators having a signal to noise ratio of Es/No=3 dB resulting from operation of a system and method according to an embodiment of the present invention.

Referring to FIG. 8, the graph 800 shows the root mean square of the modified algorithm 804 in comparison with the basic algorithm 802 and the theoretical Cramer Rao Bound 806. It is seen that the improvement in terms of root-means-square error is very modest between plots 802 and 804. However, graph doesn't account for cumulative probability distribution error. FIGS. 9–11 account for a cumulative probability distribution error at different signal to noise ratios. From these graphs, it can be seen that the asymptotes are improved by about one order of magnitude. For coded systems, it often means that the performance of the coded system can be improved by an order of magnitude when the system performance is dominated by synchronization error.

Those skilled in the art can appreciate from the foregoing description that the broad teachings of the present invention can be implemented in a variety of forms. Therefore, while this invention has been described in connection with particular examples thereof, the true scope of the invention should not be so limited since other modifications will become apparent to the skilled practitioner upon a study of the drawings, specification and the following claims.

What is claimed is:

1. A receiver for receiving a communication signal transmitted from a satellite, said signal including data information and synchronization information, said receiver comprising:
   a controller adapted to control operation of the receiver;
   a phase estimator coupled to the controller and adapted to estimate a phase offset of said received signal;
   a timing estimator coupled to the controller and adapted to estimate a timing offset of said received signal; and
   a frequency estimator coupled to the controller and adapted to derive a frequency offset from said phase and timing offset by performing the following operations:
      removing the modulation from the received signal;
      sampling the received signal for information carrying data;
      determining whether the step of sampling was done at a peak wave point of said data; and
      repeating said step of sampling in a response to a determination that said sampling was not done at a peak wave point of said data.

2. The system of claim 1, wherein said synchronization information comprises a unique word.

3. The system of claim 2, wherein said unique word comprises between ten to twenty symbols.

4. The system of claim 2, wherein said unique word comprises a known symbol arrangement between said satellite and said receiver.

5. The system of claim 2, wherein said unique word is used to derive said phase and timing offset.

6. The system of claim 1, wherein the process of determining said offset values comprises using a semi-data aided approach.

7. The system of claim 6, wherein said semi-data aided approach uses less bandwidth to transmit training information than a data-aided approach.

8. The system of claim 6, wherein said semi-data aided approach uses less time to determine synchronization information than a non-data-aided approach.

9. The system of claim 1, wherein removing said modulation comprises squaring the value of said received signal.

10. The system of claim 9, wherein said signal is delayed a half symbol.

11. The system of claim 10, wherein a subtraction is performed between the non-delayed and the delayed signal.

12. The system of claim 5, wherein said timing offset is used to adjust the sampling.

13. The system of claim 12, wherein the phase offset is used to adjust the phase.

14. The system of claim 1, wherein said phase and frequency offset are used to determine said frequency offset.

15. The system of claim 1, wherein said timing offset is redetermined by assuming said timing offset was off by a quarter of a symbol.

16. The system of claim 15, wherein said frequency derived from said original timing offset and said frequency derived from said redetermined timing offset are compared, said frequency giving better estimation is selected.

17. A method for receiving a communication signal comprising data information and synchronization information, said method comprising:
   receiving said communication signal at a receiver;
   determining a phase offset of said communication signal by processing the synchronization information;
   determining a timing offset of said communication signal by processing the synchronization information;
   removing modulation from said received communication signal;
   determining whether sampling was done at a peak wave point of said data; and
   repeating said step of sampling in a response to a determination that said sampling was not done at a peak wave point of said data.

18. The method of claim 17, wherein said synchronization information comprises a unique word.

19. The method of claim 18, wherein said unique word comprises between about ten to twenty symbols.

20. The method of claim 18, wherein said unique word comprises a known symbol arrangement between said satellite and said receiver.

21. The method of claim 18, wherein said unique word is used to derive said phase and timing offset.

22. The method of claim 17, wherein the process of determining offset values comprises using a semi-data aided approach.

23. The method of claim 22 wherein said semi-data aided approach uses less bandwidth to transmit training information than a data-aided approach.

24. The method of claim 22, wherein said semi-data aided approach uses less time to determine synchronization information than a non-data-aided approach.

25. The method of claim 17, wherein removing said modulation comprises squaring the value of said received signal.

* * * * *